United States Patent
Johri et al.

(10) Patent No.: US 10,273,895 B1
(45) Date of Patent: Apr. 30, 2019

(54) METHODS AND SYSTEM FOR DETECTING ENGINE STALL

(71) Applicant: Ford Global Technologies, LLC, Dearborn, MI (US)

(72) Inventors: Rajit Johri, Canton, MI (US); Fazal Urrahman Syed, Canton, MI (US); Joseph A. Zamora, Ann Arbor, MI (US); Paul Stephen Bryan, Belleville, MI (US); Minku Lee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/837,650

(22) Filed: Dec. 11, 2017

(51) Int. Cl.
| | |
|---|---|
| *F02D 43/04* | (2006.01) |
| *B60W 10/10* | (2012.01) |
| *B60W 10/08* | (2006.01) |
| *B60W 10/06* | (2006.01) |
| *F02D 41/06* | (2006.01) |
| *B60W 20/00* | (2016.01) |
| *F02D 41/18* | (2006.01) |

(52) U.S. Cl.
CPC ........... *F02D 41/065* (2013.01); *B60W 10/06* (2013.01); *B60W 20/00* (2013.01); *F02D 41/18* (2013.01); *B60Y 2200/92* (2013.01); *B60Y 2300/56* (2013.01); *F02D 2200/1004* (2013.01)

(58) Field of Classification Search
None
See application file for complete search history.

(56) References Cited

U.S. PATENT DOCUMENTS

| | | | |
|---|---|---|---|
| 8,386,107 B2 | 2/2013 | Shimanaka | |
| 9,005,082 B2 | 4/2015 | Okamura et al. | |
| 2006/0116236 A1 | 6/2006 | Trush et al. | |
| 2013/0297191 A1* | 11/2013 | Gibson | ............... F02N 11/0855 701/112 |
| 2018/0093657 A1* | 4/2018 | Pietron | ................. B60W 10/02 |

* cited by examiner

*Primary Examiner* — Thomas G Black
*Assistant Examiner* — Demetra R Smith-Stewart
(74) *Attorney, Agent, or Firm* — David Kelley; McCoy Russell LLP

(57) ABSTRACT

Systems and methods for operating a hybrid powertrain that includes an engine and a motor/generator are described. The systems and methods provide a way of determining whether or not an engine has stalled while a vehicle may be propelled via the motor/generator. In one example, an engine stall may be indicated responsive to a first estimated engine torque and a second estimated engine torque.

20 Claims, 4 Drawing Sheets

METHODS AND SYSTEM FOR DETECTING ENGINE STALL

FIELD

The present description relates to methods and a system for operating a powertrain of a hybrid vehicle. The methods and systems may be particularly useful for hybrid vehicles that include a torque converter and a driveline disconnect clutch.

BACKGROUND AND SUMMARY

From time to time, it may be possible for an engine of a hybrid vehicle to stall during engine starting. The engine stall may be due to poor air-fuel mixture preparation, fuel properties, or other engine operating conditions at the time of engine starting. One way to determine if an engine has stalled during engine starting is to monitor engine speed. If engine speed declines so less than a threshold speed, it may be determined that the engine has stalled to that the engine may be restarted. However, if the engine is coupled to an electric machine that is propelling the vehicle, the electric machine may rotate the engine such that an engine stall may not be detected simply by monitoring engine speed. For example, an engine may be started via closing a driveline disconnect clutch that links the engine to an electric machine that is propelling a vehicle. The engine may stall as torque provided by the electric machine accelerates the engine up to the speed of the electric machine. The engine speed may continue to increase due to torque provided by the electric machine. As such, the engine's speed may not be indicative of an engine stall condition. However, an amount of energy consumed by the electric machine may be increased to maintain engine speed without producing useful work. Therefore, it may be desirable to provide a way of determining whether or not an engine has stalled when the engine is coupled to an electric machine that propels a vehicle.

The inventors herein have recognized the above-mentioned issues and have developed a vehicle operating method, comprising: indicating an engine stall in response to a request to determine a presence or absence of the engine stall when the first engine torque is less than a second engine torque, the first engine torque based on a torque converter impeller torque and a motor torque; and opening a driveline disconnect clutch in response to indicating the engine stall.

By indicating an engine stall condition responsive to a first engine torque being less than a second engine torque, it may be possible to determine an engine stall condition when engine speed may not be indicative of an engine stall condition. For example, if an engine is attempted to be started via torque produced by an electric machine that is propelling a vehicle, an engine stall may be determined even though engine speed may be increasing. In one example, the engine stall may be based on comparing a first engine torque estimate against a second torque estimate. Thus, the engine stall condition may be determined independent of engine speed. If an engine stall condition is indicated, mitigating actions may be taken via an engine controller.

The present description may provide several advantages. In particular, the approach may determine whether or not an engine is stalled even if the engine is rotating at a same speed as an electric machine that is propelling a vehicle. Further, the approach may be provided without additional engine sensors or actuators. Further still, the approach may reduce energy consumption if an engine stall occurs.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
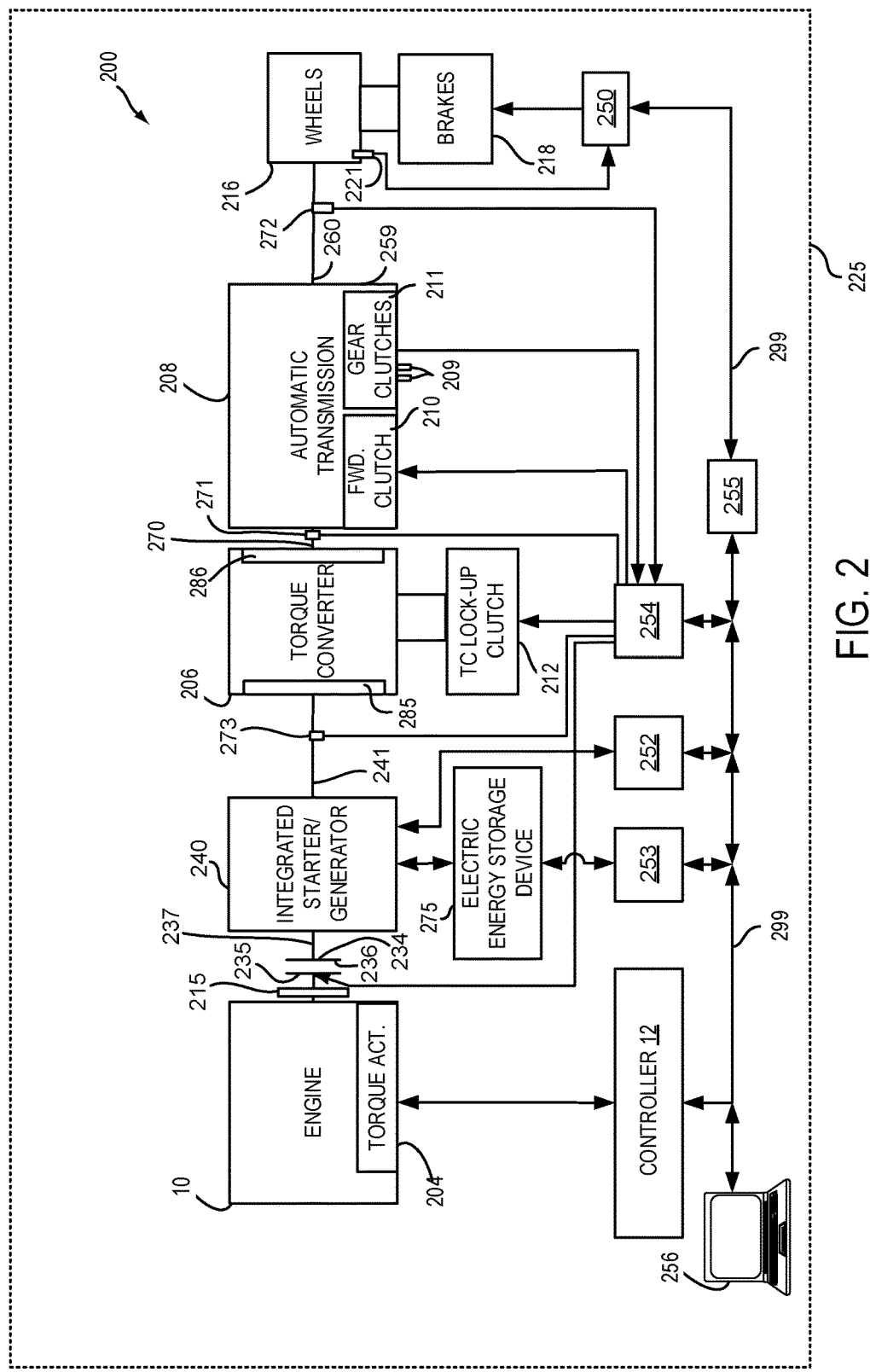
FIG. 2 is a schematic diagram of a hybrid vehicle powertrain.
Figure 3:
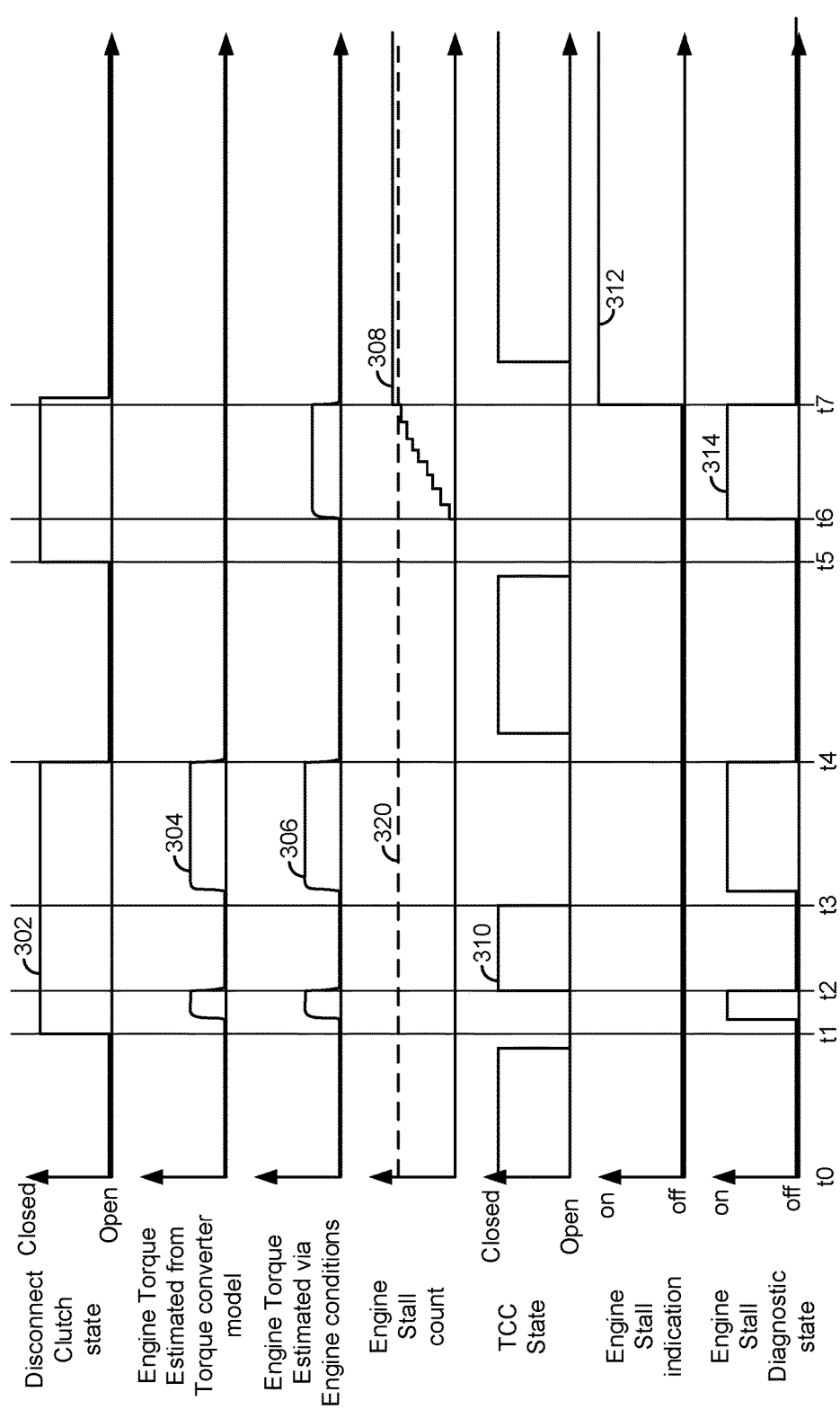
FIG. 3 is a plot showing an example vehicle operating sequence.

The present description is related to determining whether or not an engine stall occurs after engine starting is attempted. The engine start may be attempted when a vehicle in which the engine resides is stationary or moving. The engine may be of the type shown in FIG. 1, or alternatively, the engine may be a diesel engine. The engine and an electric machine may be incorporated into a powertrain as is shown in FIG. 2. The engine and electric machine may operate as shown in FIG. 3 according to the method of FIG. 4. The method of FIG. 4 may be incorporated into the system of FIGS. 1 and 2.

Figure 1:
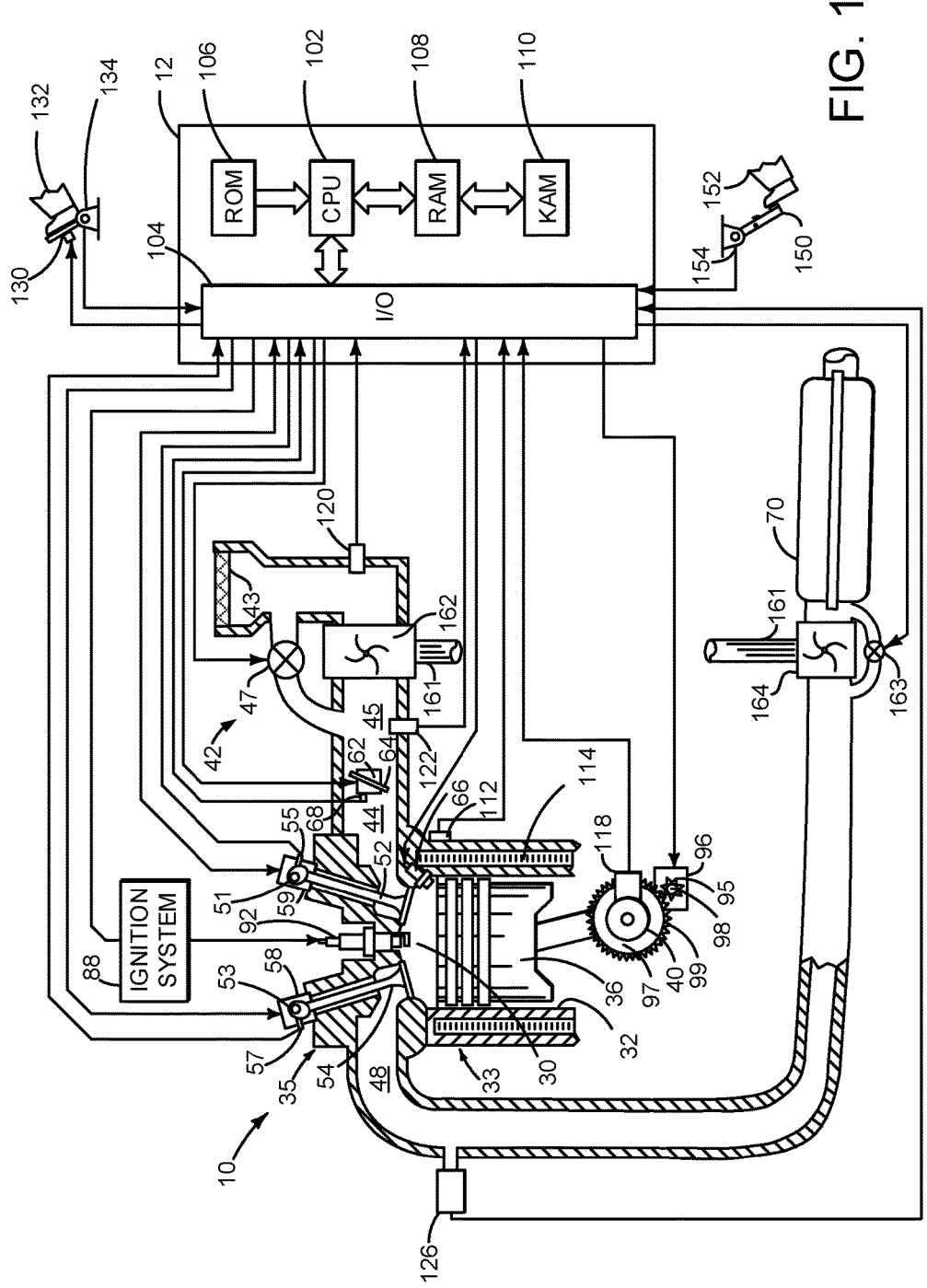
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller may provide commands to engine controller 12, electric machine controller 252, transmission controller 254, and brake controller 250 to achieve driver input requests and other requests that are based on vehicle operating conditions. Status information may be provided to a driver via human/machine interface 256 (e.g., keyboard and display).

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, powertrain control devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. Speed sensor 273 senses torque converter impeller speed. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position or torque converter turbine speed via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a vehicle system, comprising: an electric machine; an engine; a driveline disconnect clutch mechanically coupled to the engine and the electric machine; and one or more controllers including executable instructions stored in non-transitory memory to indicate an engine stall in response to a first engine torque being less than a second engine torque, the first engine torque based on torque converter impeller torque and torque of the electric machine, the second engine torque based on engine operating conditions. The system includes where the engine operating conditions are engine air flow and engine fuel flow. The system further comprises additional instructions to increment a counter in response to the first engine torque being less than the second engine torque. The system further comprises additional instructions to indicate the engine stall in response to a value of the counter exceeding a threshold. The system further comprises additional instructions to cease incrementing the value of the counter in response to a torque converter clutch being locked. The system further comprises additional instructions to automatically restart the engine in response to the indication of engine stall.

Referring now to FIG. 3, an example vehicle operating sequence is shown. The vehicle operating sequence of FIG. 3 may be provided via the system of FIGS. 1 and 2 according to the method of FIG. 4. The plots of FIG. 3 are time aligned and they occur at the same time. Vertical lines at time t0-t7 represent times of interest in the sequence.

The first plot from the top of FIG. 3 is a plot of driveline disconnect clutch operating state versus time. The horizontal axis represents time and time increases from the left side of the plot to the right side of the plot. The vertical axis represents driveline disconnect clutch operating state and the driveline disconnect clutch is open and not transferring torque when trace 302 is at a lower level near the horizontal axis. The driveline disconnect clutch is closed when trace 302 is at a higher level near the vertical axis arrow. Trace 302 represents driveline disconnect clutch operating state.

The second plot from the top of FIG. 3 is a plot of engine torque estimated from a torque converter model versus time. The horizontal axis represents time and time increases from the left side of the plot to the right side of the plot. The vertical axis represents engine torque as estimated from a torque converter model and engine torque increases in the direction of the vertical axis arrow. Trace 304 represents engine torque.

The third plot from the top of FIG. 3 is a plot of engine torque estimated from engine conditions versus time. The horizontal axis represents time and time increases from the left side of the plot to the right side of the plot. The vertical axis represents engine torque as estimated from engine conditions and engine torque increases in the direction of the vertical axis arrow. Trace 306 represents engine torque.

The fourth plot from the top of FIG. 3 is a plot of counts of an engine stall counter versus time. The vertical axis represents a value of an engine stall counter and the value of the engine stall counter increases in the direction of the vertical axis arrow. Trace 308 represents the value stored in the engine stall counter. The horizontal axis represents time and time increases from the left side of the plot to the right side of the plot.

The fifth plot from the top of FIG. 3 is a plot torque converter clutch (TCC) operating state versus time. The horizontal axis represents time and time increases from the left side of the plot to the right side of the plot. The vertical axis represents TCC state and the TCC is closed and locked when trace 310 is at a higher level near the vertical axis arrow. Trace 310 represents TCC state. The TCC is open when trace 310 is at a lower level near the horizontal axis.

The sixth plot from the top of FIG. 3 is a plot an engine stall indication state versus time. The horizontal axis represents time and time increases from the left side of the plot to the right side of the plot. The vertical axis represents engine stall indication state and the engine stall indication is asserted or on when trace 312 is at a higher level near the vertical axis arrow. The engine stall indication is not asserted when trace 312 is at a low level near the horizontal axis. Trace 312 represents engine stall indication state.

The seventh plot from the top of FIG. 3 is a plot an engine stall diagnostic state versus time. The horizontal axis represents time and time increases from the left side of the plot to the right side of the plot. The vertical axis represents engine stall diagnostic state and the engine stall diagnostic is asserted or on when trace 314 is at a higher level near the vertical axis arrow. The engine stall diagnostic is not asserted when trace 314 is at a low level near the horizontal axis. The engine stall diagnostic is activated when trace 314 is at a higher level. Trace 314 represents engine stall diagnostic state.

At time t0, the driveline disconnect clutch is open so that the engine is decoupled from the electric machine. The engine torque estimate from the torque converter is zero and the engine torque estimated from engine conditions is zero indicating that the engine is not operating (e.g., combusting air and fuel). The engine stall count value is zero and the TCC is closed. The engine stall indication is not asserted and the engine stall diagnostic is not activated. Such conditions may be indicative of when the electric machine is propelling the vehicle and the engine is stopped to conserve fuel.

Between time t0 and time t1, the TCC opens. The TCC may open in response to a request to start the engine or in response to other vehicle operating conditions, such as an increase in driver demand torque. The remaining operating conditions stay at their previous levels.

At time t1, the driveline disconnect clutch closes to rotate the engine using torque from the electric machine. Further, an attempt to start the engine is performed and the engine speed accelerates toward the electric machine speed (not shown). The engine starts and engine torque estimated from the torque converter model is zero because the diagnostic is not activated. The engine torque estimated from engine conditions is also zero since the diagnostic is not activated. However, in other examples, the engine torque estimate based on engine conditions may continue to be determined. The TCC remains open and engine stall is not indicated.

Between time t1 and time t2, the engine stall diagnostic is activated and engine stall is not indicated. The engine torque estimated from the torque converter model increases in response to the engine diagnostic being activated. The engine torque estimated from engine conditions also increases in response to the engine stall diagnostic being activated. The driveline disconnect clutch remains closed and the TCC state remains open. The engine stall count value remains at a zero since the engine torque estimated from the torque converter model is not less than the engine torque estimated from engine conditions.

At time t2, the TCC closes responsive to vehicle operating conditions. The engine stall diagnostic ends in response to the TCC closing. Engine stall is not indicated and the engine stall count value remains zero. The engine torque estimated from the torque converter model transitions to zero and the engine torque estimated from engine conditions transitions to zero. The driveline disconnect clutch remains closed.

At time t3, the TCC opens a second time in response to vehicle conditions. The engine stall diagnostic is activated shortly after time t3 in response to the TCC opening. Engine stall is not indicated and the engine stall count value remains zero. The engine torque estimated from the torque converter model increases along with the engine torque estimated from engine conditions in response to the engine stall diagnostic being activated. The driveline disconnect clutch remains closed.

At time t4, the driveline disconnect clutch opens to disconnect the engine from the electric machine. The TCC remains open and the engine stall count value remains zero. The engine torque estimated from the torque converter model is zero and the engine torque estimated from engine conditions is also zero. The engine stall diagnostic ceases in response to the driveline disconnect clutch opening.

Between time t4 and time t5, driveline disconnect clutch remains open and the engine stall diagnostic is not asserted. Engine stall is not indicated and the engine stall count value is zero. The TCC opens and closes and the engine torque estimates are zero.

At time t5, the driveline disconnect clutch closes in response to vehicle operating conditions, such as a low state of battery charge or an increase in driver demand torque. An engine start is attempted while the TCC is open. The engine torque estimated from the torque converter model remains zero since the engine stall diagnostic is not activated. Likewise, the engine torque estimated from engine conditions is zero since the engine stall diagnostic is not activated. Engine stall is not indicated and the engine stall counter value is zero.

At time t6, the engine stall diagnostic is activated, but the engine torque estimate from the torque converter model is zero since the engine did not start. The engine torque estimate from engine conditions increases such that the engine torque estimate from engine conditions is greater than the engine torque estimate from the torque converter model. The engine stall counter value begins to increase in response to the engine torque estimate from engine conditions being greater than the engine torque estimate from the torque converter model. The driveline disconnect clutch remains closed and the TCC remains open. Engine stall is not indicated.

At time t7, the engine stall count value has increased to exceed threshold 320. Therefore, engine stall is indicated and the driveline disconnect clutch is opened shortly thereafter. The engine torque estimates are zero and the TCC remains open. The engine stall diagnostic is deactivated in response to the engine stall count value.

In this way, an engine stall may be indicated responsive to two estimated engine torque values. Further, the driveline disconnect clutch is opened to reduce the load on the electric machine. In some examples, an engine restart may be attempted and adjustments to other engine actuators may be performed in response to the engine stall indication.

Figure 4:
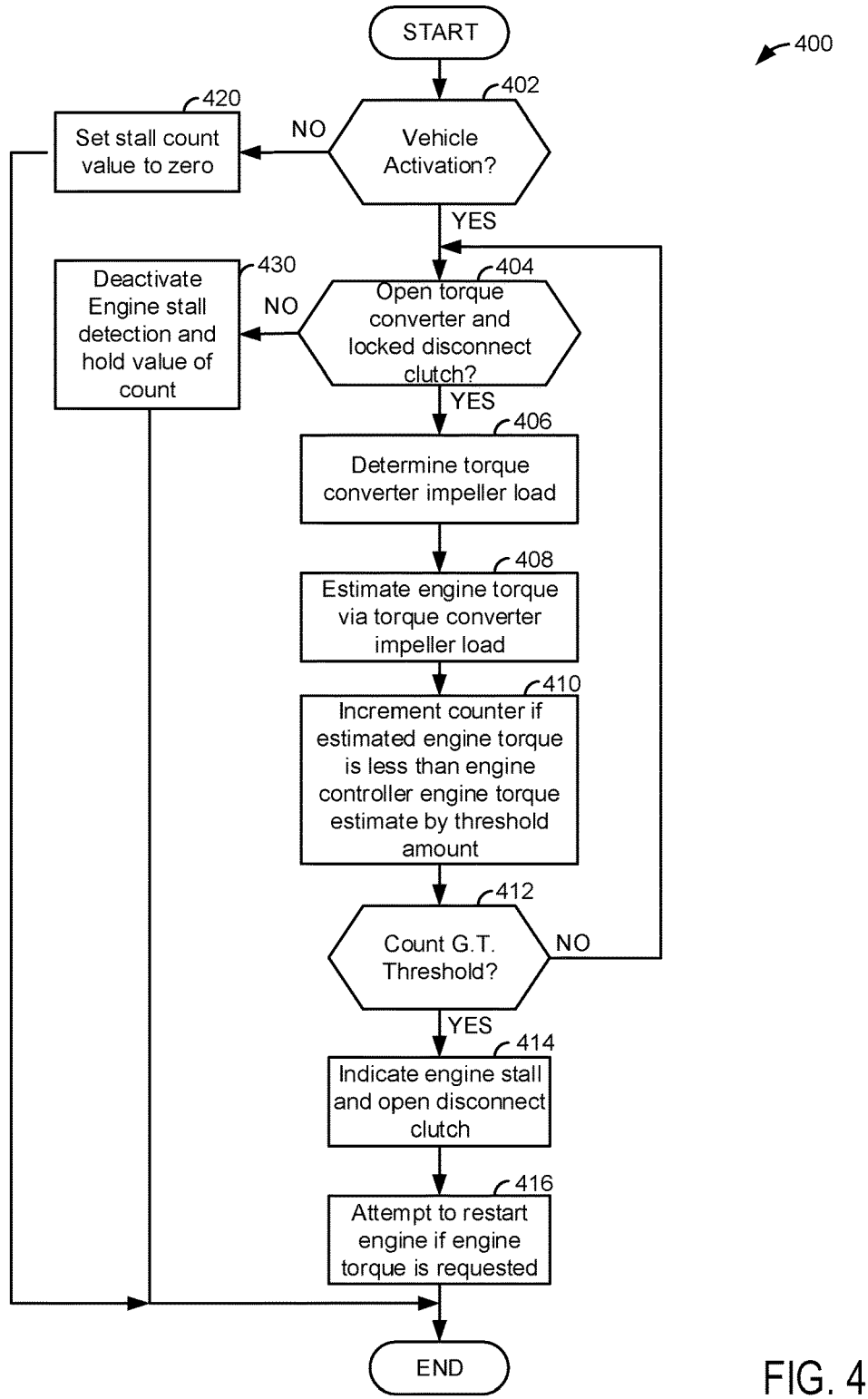
FIG. 4 shows an example flowchart of a method for operating a vehicle.

Referring now to FIG. 4, an example flowchart for operating a hybrid vehicle is shown. At least portions of the method of FIG. 4 may be incorporated as executable instructions stored in non-transitory memory of the system shown in FIGS. 1 and 2. Additionally, portions of the method of FIG. 4 may take place in the physical world as operations or actions performed by a controller to transform an operating state of one or more devices. The method of FIG. 4 may also provide the operating sequence shown in FIG. 3.

At 402, method 400 judges if the vehicle in which the engine resides is activated. The vehicle may be activated in response to an operator being within a threshold distance of the vehicle. In some examples, the vehicle may be activated in response to an operator requesting that the vehicle be activated via a pushbutton, key switch, or other type of human/machine interface. If method 400 judges that the vehicle is activated, the answer is yes and method 400 proceeds to 404. Activating the vehicle may include supplying electrical power or chemical power to vehicle propulsion sources. If method 400 judges that the vehicle is not activated, the answer is no and method 400 proceeds to 420.

At 420, method 400 sets the value of the stall counter to zero. By adjusting the value of the stall counter to zero, the possibility of indicating an engine stall after too short of a time period after low engine torque may be avoided. The engine stall counter may be configured in controller hardware or as a value in controller memory. Method 400 proceeds to exit.

At 404, method 400 judges if the torque converter clutch is open and if the driveline disconnect clutch is closed. Method 400 may judge that the torque converter clutch is open if the torque converter is commanded open via a controller. Alternatively, torque converter clutch position may be sensed to determine whether or not the torque converter clutch is open. Method 400 may judge that the driveline disconnect clutch is closed if the driveline disconnect clutch is commanded closed via a controller. Alternatively, method 400 may judge that the driveline disconnect clutch is closed via a sensor. If method 400 judges that the driveline disconnect clutch is closed and that the torque converter clutch is open, the answer is yes and method 400 proceeds to 406. Otherwise, the answer is no and method 400 proceeds to 430. When the driveline disconnect clutch is closed and the torque converter clutch is open, it may be possible to estimate engine torque via a torque converter model. However, if the torque converter clutch is closed, the torque converter model may be an insufficient basis for estimating engine torque so the engine stall diagnostic may be delays. Further, if the driveline disconnect clutch is open, engine torque cannot be transferred to the torque converter impeller so that estimating engine torque may be futile. Therefore, the engine stall diagnostic may be delayed.

At 430, method 400 deactivates the engine stall diagnostic for determining engine stall and method 400 also holds the present value of the engine stall count. For example, if the engine stall count value is two, method 400 maintains a value of two in the engine stall counter. Method 400 proceeds to exit.

At 406, method 400 estimates the torque converter impeller torque load. In one example, method 400 estimates the torque converter impeller load via the following equations:

$$\tau_{TC}^{imp} = \left(\frac{\omega_{imp}}{K(SR)}\right)^2$$

$$SR = \frac{\omega_{imp}}{\omega_{turbine}}$$

where $\tau_{TC}^{imp}$ is the torque converter impeller torque load, $\omega_{imp}$ is torque converter impeller speed, K is a torque converter capacity factor curve that is a function of torque converter speed ratio SR, and where $\omega_{turbine}$ is torque converter impeller speed. The torque converter impeller speed and the torque converter turbine speed are determined via speed sensors. Method 300 proceeds to 408.

At 408, method 400 estimates engine torque via torque converter impeller load. In one example, method 400 estimates engine torque via the following equation:

$$\tau hd\, emg^{est} = \tau_{TC}^{imp} - \tau_{mtr}^{est}$$

where $\tau_{eng}^{est}$ is estimated engine torque and $\tau_{mtr}^{est}$ is estimated electric machine or motor torque. Motor torque may be estimated from motor current and motor speed as is known in the art. Method 400 proceeds to 410 after estimating engine torque via the torque converter model.

At 410, method 400 estimates engine torque responsive to engine conditions. Further, method 400 increments an engine stall count value in response to engine torque estimated from the torque converter model being a threshold torque amount less than engine torque estimated from engine conditions. Engine torque may be estimated from engine speed, engine air amount, engine spark timing, and amount of fuel supplied to the engine. In one example, engine speed, engine air amount, and amount of fuel supplied to the engine reference a table or function of empirically determined torque values and the table or function outputs an estimate of engine torque. The values in the table or function may be empirically determined. The engine torque value retrieved from the table or function may then be modified responsive to engine spark timing if the engine is a spark ignition engine. In one example, the torque output from the table or function may be modified responsive to an amount of spark timing retard from minimum spark timing for best engine torque. The torque modification may be empirically determined and stored in a table or function. If the engine torque estimated from the torque converter model plus an offset torque amount is less than engine torque estimated from engine conditions, method 400 increments an engine stall count value. The engine stall count value may be incremented each time method 400 executes when engine torque estimated from the torque converter model plus an offset torque amount is less than engine torque estimated from engine conditions. If engine torque estimated from the torque converter model plus an offset torque amount is not less than engine torque estimated from engine conditions, then the engine stall counter value is not incremented. Method 400 proceeds to 412.

At 412, method 400 judges if the engine stall counter value is greater than (G.T.) a threshold value. If so, the answer is yes and method 400 proceeds to 414. If not, the answer is no and method 400 returns to 404. In addition, if the vehicle is deactivated, method 400 may exit.

At 414, method 400 indicates an engine stall condition and opens the driveline disconnect clutch. Further, in some examples, method 400 may deactivate fuel injection so that an undesirable amount of fuel does not accumulate in the engine. Further, method 400 may temporarily open the throttle to flush excess fuel from engine cylinders. Method 400 may also cease to supply spark to engine cylinders, or method 400 may adjust spark timing (e.g., advance spark timing) to attempt to increase engine torque production if the engine is being cold started. The engine stall condition may be indicated to vehicle occupants via human/machine interface. Further, one or more controllers in the vehicle system may be notified of the engine stall condition. For example, the electric machine controller may be notified of the engine stall condition and the engine controller may be notified of the engine stall condition so that mitigating actions may be taken. Method 400 proceeds to 416.

At 416, method 400 may attempt to restart the engine. The engine restart attempt may be performed if less than a threshold number of engine restart attempts have been performed. Further, the engine restart attempt may be performed if battery charge is less than a threshold amount or if the electric machine has less torque output capacity than is presently being requested via a vehicle operator or controller. In one example, the engine restart attempt may be performed via engaging starter 96. In another example, the engine restart may be attempted via closing the driveline disconnect clutch to accelerate the engine via torque provided via electric machine 240. Method 400 proceeds to exit.

In this way, an engine stall condition may be detected so that electric power is not consumed via rotating an engine that is not combusting air and fuel. The engine stall condition may indicate that combustion is not occurring within the engine or that torque produced via the engine is less than a threshold amount, which may indicate engine torque production issues. If an engine stall condition is indicated, an attempt to restart the engine may be performed.

Thus, the method of FIG. 4 provides for a vehicle operating method, comprising: indicating an engine stall in response to a request to determine a presence or absence of the engine stall when the first engine torque is less than a second engine torque, the first engine torque based on a torque converter impeller torque and a motor torque; and opening a driveline disconnect clutch in response to indicating the engine stall. The method further comprises incrementing a counter value in response to the first torque being less than the second engine torque and opening the driveline disconnect clutch in response to a value of the counter exceeding a threshold. The method further comprises initiating an automatic engine restart in response to the engine stall. The method includes where the automatic engine restart includes engaging a starter motor and cranking the engine via a flywheel. The method includes where the request to determine the presence or absence of the engine stall is generated when a torque converter clutch is open. The method further comprises delaying the request to determine the presence or absence of the engine stall in response to a torque converter clutch being closed. The method includes where the second engine torque is an estimation of engine torque that is responsive to engine air flow and engine fuel flow.

The method of FIG. 4 also provides for a vehicle operating method, comprising: indicating an engine stall in response to a request to determine a presence or absence of the engine stall when the first engine torque is less than a second engine torque, the first engine torque based on a torque converter impeller torque and a motor torque; and adjusting an engine actuator in response to the indicated engine stall. The method includes where the engine actuator is a fuel injector, and where fuel flow through the fuel injector is ceased in response to the indicated engine stall. The method includes where the engine actuator is an engine throttle, and where the engine throttle is opened in response to the indicated engine stall. The method further comprises incrementing a value of a counter of a controller in response to the first torque being less than the second engine torque and opening the driveline disconnect clutch in response to a count of the counter exceeding a threshold. The method includes where the second engine torque is an estimation of engine torque that is responsive to engine air flow and engine fuel flow. The method includes where the engine stall is an engine producing less than a threshold amount of torque. The method includes where the engine actuator is an ignition coil, and where spark timing provided via the ignition coil is adjusted.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
indicating an engine stall in response to a request to determine a presence or absence of the engine stall when a first engine torque is less than a second engine torque, the first engine torque based on a torque converter impeller torque and a motor torque; and
opening a driveline disconnect clutch in response to indicating the engine stall.

2. The method of claim 1, further comprising incrementing a value of a counter in response to the first engine torque being less than the second engine torque and opening the driveline disconnect clutch in response to the value of the counter exceeding a threshold.

3. The method of claim 1, further comprising initiating an automatic engine restart in response to the engine stall.

4. The method of claim 3, where the automatic engine restart includes engaging a starter motor and cranking an engine via a flywheel.

5. The method of claim 1, where the request to determine the presence or absence of the engine stall is generated when a torque converter clutch is open.

6. The method of claim 1, further comprising delaying the request to determine the presence or absence of the engine stall in response to a torque converter clutch being closed.

7. The method of claim 1, where the second engine torque is an estimation of engine torque that is responsive to engine air flow and engine fuel flow.

8. A vehicle operating method, comprising:
indicating an engine stall in response to a request to determine a presence or absence of the engine stall when a first engine torque is less than a second engine torque, the first engine torque based on a torque converter impeller torque and a motor torque; and
adjusting an engine actuator in response to the indicated engine stall.

9. The method of claim 8, where the engine actuator is a fuel injector, and where fuel flow through the fuel injector is ceased in response to the indicated engine stall.

10. The method of claim 9, where the engine actuator is an engine throttle, and where the engine throttle is opened in response to the indicated engine stall.

11. The method of claim 8, further comprising incrementing a value of a counter in response to the first engine torque being less than the second engine torque and opening a driveline disconnect clutch in response to the value of the counter exceeding a threshold.

12. The method of claim 11, where the second engine torque is an estimation of engine torque that is responsive to engine air flow and engine fuel flow.

13. The method of claim 8, where the engine stall is an engine producing less than a threshold amount of torque.

14. The method of claim 8, where the engine actuator is an ignition coil, and where spark timing provided via the ignition coil is adjusted.

15. A vehicle system, comprising:
an electric machine;
an engine;
a driveline disconnect clutch mechanically coupled to the engine and the electric machine; and
one or more controllers including executable instructions stored in non-transitory memory to indicate an engine stall in response to a first engine torque being less than a second engine torque, the first engine torque based on torque converter impeller torque and torque of the electric machine, the second engine torque based on engine operating conditions.

16. The system of claim 15, where the engine operating conditions are engine air flow and engine fuel flow.

17. The system of claim 15, further comprising additional instructions to increment a counter in response to the first engine torque being less than the second engine torque.

18. The system of claim 17, further comprising additional instructions to indicate the engine stall in response to a value of the counter exceeding a threshold.

19. The system of claim 18, further comprising additional instructions to cease incrementing the value of the counter in response to a torque converter clutch being locked.

20. The system of claim 15, further comprising additional instructions to automatically restart the engine in response to the indication of engine stall.

* * * * *